United States Patent [19]

Crescentini

[11] Patent Number: 4,979,367
[45] Date of Patent: Dec. 25, 1990

[54] BRAKE MASTER CYLINDER WITH SELECTIVELY POSITIONABLE BLEED SCREWS

[75] Inventor: Dino Crescentini, Pacific Palisades, Calif.

[73] Assignee: SBC Ltd., Carson, Calif.

[21] Appl. No.: 309,114

[22] Filed: Feb. 13, 1989

[51] Int. Cl.⁵ .......................... B60T 11/30; F15B 7/10
[52] U.S. Cl. .......................................... 60/584; 92/59
[58] Field of Search .................... 60/562, 581, 584; 92/58.1, 86.5, 142, 59

[56] References Cited

U.S. PATENT DOCUMENTS

| | | | |
|---|---|---|---|
| 2,208,575 | 7/1940 | Frank | 60/584 X |
| 2,340,462 | 2/1944 | Gallup et al. | 60/562 X |
| 3,068,651 | 12/1962 | Shutt | 60/562 |
| 3,406,520 | 10/1968 | Casellas | 60/584 X |
| 3,499,287 | 3/1970 | Schrader | 60/562 |
| 3,752,272 | 8/1973 | Ooka | 60/581 X |
| 3,844,121 | 8/1974 | Griesenbrock | 60/562 |
| 3,972,192 | 8/1976 | Muterel | 60/562 |
| 4,270,354 | 6/1981 | Koshimizu | 60/581 |
| 4,419,923 | 12/1983 | Kasahara | 60/584 X |
| 4,505,115 | 3/1985 | Arbuckle | 60/562 |

FOREIGN PATENT DOCUMENTS

| | | | |
|---|---|---|---|
| 750646 | 2/1954 | United Kingdom | 60/584 |
| 2098683 | 11/1982 | United Kingdom | 60/562 |

*Primary Examiner*—Carl D. Price
*Assistant Examiner*—John E. Ryznic

[57] ABSTRACT

A master cylinder for hydraulic use, particularly for brake systems for cars. At least two bleed screw openings mounted on the master cylinder body. The first bleed screw opening receives the bleed screw, the second bleed screw opening receives a plug screw.

3 Claims, 2 Drawing Sheets

BRAKE MASTER CYLINDER WITH SELECTIVELY POSITIONABLE BLEED SCREWS

DETAILED DESCRIPTION OF THE INVENTION

Automobile brake systems require master cylinders. They transfer the force of the drivers foot into hydraulic pressure, thereby actuating the brakes and slowing the car. The master cylinder frequently comes from the factory with more than one position for the bleed screw to be machined into the master cylinder. However, the master cylinder invariably has only one port opened at each hydraulic stage machined for the bleed screw. That results in a proliferation of replacement parts having minor differences.

Master cylinders can be mounted in a vehicle, such as automobile or truck, in many different configurations in the factory. Differences in engines, accessories attached to the fire wall, and driver's side may dictate that a bleed valve mounted on the right side or left side is more convenient. As a given car model, or family of models, for example, the cars produced by Nissan ® or Toyota ® may have the bleed screw side changed from year to year as new accessories are added to the car and the car is otherwise modified. Therefore, a series of cars may have several different master cylinders. A replacement parts store should ideally carry each of them.

By opening all ports during manufacture, and providing those ports not needed with threaded plugs, the number of different replacement parts needed for a particular line of cars is greatly reduced. It would be advantageous to have only one part that could be used interchangeably for the variety of parts from the manufacturer. Then a replacement parts store need only carry one part to replace many original parts.

SUMMARY OF THE INVENTION

This invention provides a master cylinder for hydraulic use, particularly for brake systems for cars. At least two bleed screw openings are mounted at each hydraulic outlet stage on the master cylinder body. The first bleed screw opening receives the bleed screw, the second bleed screw opening receives a plug screw.

An aspect of this invention is a master cylinder housing, comprising:
a body;
a central portion within said body for movably mounting hydraulic piston;
at least one hydraulic fluid inlet mounted on said body providing hydraulic communication into the central portion;
at least one hydraulic fluid outlet mounted on said body providing hydraulic communication into the central portion; and
at least two bleed screw openings mounted on said body, a first bleed screw opening receiving a bleed screw, a second bleed screw opening receiving a plug screw.

A further aspect of this invention is a master cylinder housing, comprising:
a body;
a central portion within said body for movably mounting a hydraulic piston;
at least one hydraulic fluid inlet mounted on said body providing hydraulic communication into the central portion; and
at least two hydraulic fluid outlets mounted on said body providing hydraulic communication into the central portion, a first hydraulic fluid outlet mating to a hydraulic line, a second hydraulic fluid outlet receiving a bleed screw.

An aspect of this invention is a master cylinder housing comprising a body having at least two open ports at each hydraulic outlet stage.

DETAILED DESCRIPTION

Figure 1:
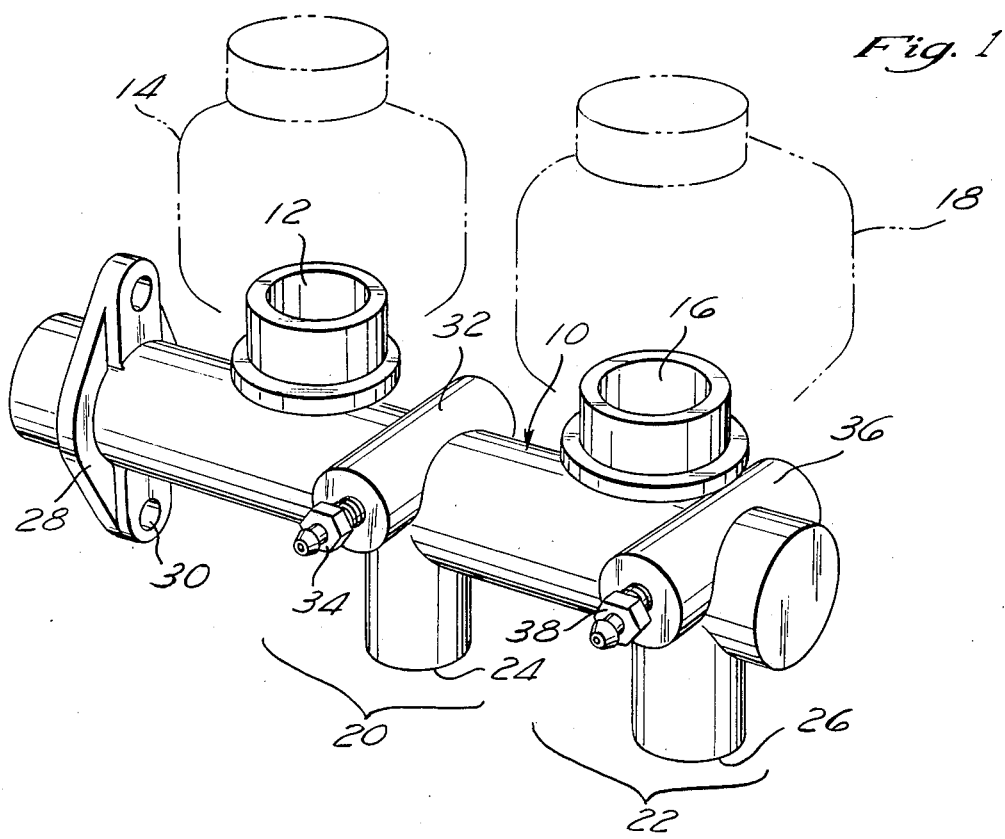
FIG. 1 shows a top perspective view of a master cylinder of this invention from the left side.

Referring to FIG. 1, an automobile master cylinder body 10 has a central portion disposed within the body for movably receiving the brake piston. A first hydraulic fluid inlet 12 attach to a first hydraulic fluid reservoir 14 (shown in phantom) containing an amount of hydraulic fluid and a second hydraulic fluid inlet 16 attaches to a second hydraulic fluid resevoir. The inlets provide hydraulic communication with the central portion of the body.

The master cylinder has a first hydraulic outlet stage 20 and a second hydraulic outlet stage 22. Typically, master cylinders have more than one hydraulic stage to provide a safety margin if one stage fails. However, the scope of this invention covers all master cylinders having one or more hydraulic stages.

A first hydraulic fluid outlet 24 and a second hydraulic fluid outlet 26 is molded into the body. When the master cylinder is mounted and charged with hydraulic fluid, the outlets attach to hydraulic lines that lead to the brakes of the vehicle.

A mounting flange 28 attaches to the fire wall of the automobile by screw means through a plurality of openings 30. A piston is mounted inside the body and is activated by depressing the brake pedal. This pressurizes the hydraulic fluid thereby activating the brakes.

A first aperture in a first bleed screw mounting 32 receives a first bleed screw 34. A first aperture in a second bleed screw mounting 36 receives a second bleed screw 38.

Figure 2:
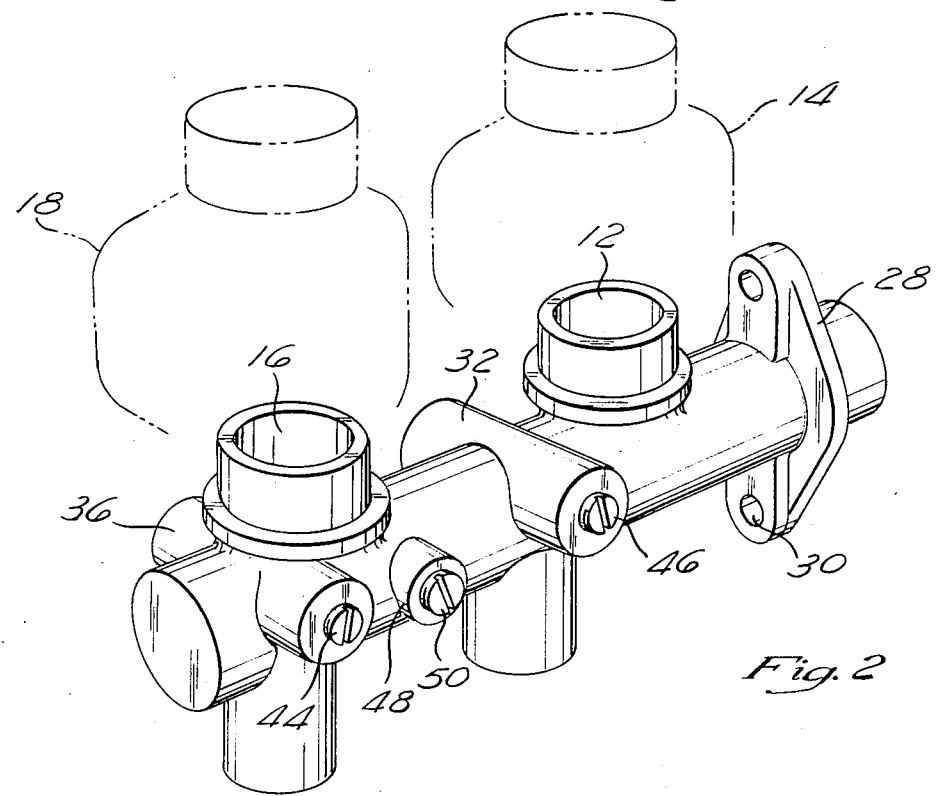
FIG. 2 shows a top perspective view of the master cylinder of FIG. 1 from the right side.

Referring to FIG. 2, the second aperture in the first bleed screw mounting receives a first plug 46. The second aperture in the second bleed screw mounting receives a second plug 44. An access port 48 receives a plug screw 50.

At the first hydraulic stage and second hydraulic stage are three ports: a hydraulic fluid outlet port 24 and 26, a bleed screw port receiving a bleed screw 34 and 38, and a port that is plugged 44 and 46. If the design of the master cylinder allows, it is possible to move between the three ports and abritrarily assign the function. In the design of the master cylinder shown in FIGS. 1 and 2, the first and second apertures in the first and second mountings can receive either a plug screw or a bleed screw, allowing any of four distinct configurations of bleed screws.

Figure 3:
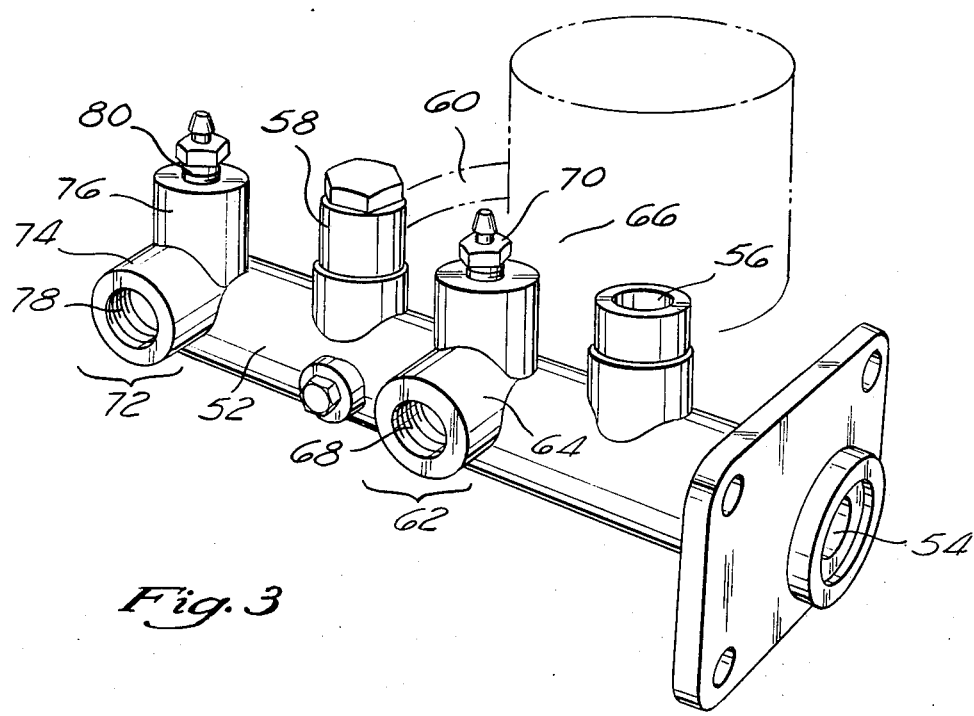
FIG. 3 shows a top perspective view of a second embodiment of the master cylinder of this invention.

Referring to FIG. 3 a master cylinder body 52 has a central portion 54 disposed within the body for movably receiving the brake piston. A first hydraulic fluid inlet 56 is attached to hydraulic fluid reservoir (shown in phantom) that contain an amount of hydraulic fluid.

In the configuration shown a single reservoir provides hydraulic fluid to the second hydraulic fluid inlet 58 by a fluid conduit means 60. Also molded into the body at a first hydraulic outlet stages 62 are a first hydraulic outlet 64 and second hydraulic outlet 66. Either the first or the second hydraulic outlet is chosen as the port for connection with the hydraulic line to the brakes in the vehicle. As shown, the first hydraulic outlet can receive an externally threaded conduit 68 and the second receives a bleed plug 70.

The second hydraulic outlet stage 72 has a third hydraulic fluid outlet 74 and the fourth hydraulic fluid outlet 76. As shown here, the third hydraulic outlet can receive a conduit 78 and the fourth receives a bleed plug 80.

The hydraulic bleed screw is externally threaded to be received into a hydraulic outlet aperture. A bleed screw aperture exists within the hydraulic plug to receive a bleed screw. The bleed screw extends into the body of the master cylinder.

The configuration of hydraulic lines to the brakes can be selected to match a predetermined manufactured configuration. In this embodiment, a bleed screw exists on the replacement part that may not have been present on the original part. This avoids time consuming bench bleeding.

The master cylinder is attached to the fire wall by screw means through the flange 82. The brake is mechanically linked to the piston within the housing through the central portion.

I claim:

1. A master cylinder comprising, a body having at least one hydraulic stage;
   a central portion within said body for movably mounting a hydraulic piston;
   at least one hydraulic fluid inlet mounted on said body providing hydraulic communication into the central portion;
   at least on hydraulic outlet mounted on said body providing hydraulic communication from the central portion; and
   at least two bleed screw openings mounted on said body at each hydraulic stage; at least one of said bleed screw openings receiving a bleed screw for bleeding air from the central portion; and at least one other of said bleed screw openings receiving a removable plug screw, all other-wise open bleed screw openings receiving an additional plug screw, and providing means to switch the location of the bleed screw and the plug screw.

2. The master cylinder of claim 1, wherein at least one of said ports receives a bleed screw and one other receives a plug screw.

3. The master cylinder of claim 1, wherein said three ports include a hydraulic outlet port that receives a bleed screw, a bleed port, and a port that receives a plug screw.

* * * * *